(12) United States Patent
Weikert et al.

(10) Patent No.: US 12,025,734 B2
(45) Date of Patent: Jul. 2, 2024

(54) RADAR TARGET SIMULATION SYSTEM, RADAR TEST SYSTEM AND METHOD FOR OPERATING A RADAR TARGET SIMULATION SYSTEM

(71) Applicant: Rohde & Schwarz GmbH & Co. KG, Munich (DE)

(72) Inventors: Oomke Weikert, Munich (DE); Guenter Huber, Munich (DE); Johannes Schoeller, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 261 days.

(21) Appl. No.: 16/935,394

(22) Filed: Jul. 22, 2020

(65) Prior Publication Data
US 2021/0055381 A1 Feb. 25, 2021

(30) Foreign Application Priority Data
Aug. 20, 2019 (EP) ...................................... 19192691

(51) Int. Cl.
*G01S 7/40* (2006.01)

(52) U.S. Cl.
CPC .............. *G01S 7/4052* (2013.01); *G01S 7/40* (2013.01); *G01S 7/4065* (2021.05)

(58) Field of Classification Search
CPC ........ G01S 7/4052; G01S 7/40; G01S 7/4065; G01S 7/4069; G01S 2007/4065
USPC ........................................................ 342/171
See application file for complete search history.

(56) References Cited

U.S. PATENT DOCUMENTS

| | | | | |
|---|---|---|---|---|
| 3,090,955 | A * | 5/1963 | Hubka | G01S 7/4065 455/67.15 |
| 10,317,518 | B2 * | 6/2019 | Warnick | H01Q 13/085 |
| 2010/0109940 | A1 * | 5/2010 | Williams | G01S 7/4052 342/171 |
| 2010/0121617 | A1 * | 5/2010 | Gruener | G06F 17/14 703/2 |
| 2018/0188317 | A1 * | 7/2018 | Maiellaro | G01S 7/4056 |

(Continued)

FOREIGN PATENT DOCUMENTS

| | | | | | |
|---|---|---|---|---|---|
| CN | 104515978 | A * | 4/2015 | ........... | G01S 7/4052 |
| CN | 109143186 | A * | 1/2019 | ........... | G01S 7/4052 |
| DE | 102016121296 | A1 * | 5/2018 | ........... | G01S 7/4052 |

(Continued)

OTHER PUBLICATIONS

Plasberg G: "Simulation Von Radarzielen", Frequenz, Schiele Uno Schon, Berlin, DE, vol. 45, No. 5 / 06, May 1, 1991 (May 1, 1991), pp. 110-115, XP000234619, ISSN: 0016-1136 (Year: 1991).*

(Continued)

*Primary Examiner* — Olumide Ajibade Akonai
*Assistant Examiner* — Yonghong Li
(74) *Attorney, Agent, or Firm* — CHRISTENSEN O'CONNOR JOHNSON KINDNESS PLLC

(57) ABSTRACT

A radar target simulation system for simulating at least one moving radar target is disclosed. The radar target simulation system includes an analog to digital converter and at least one digital processing channel. The digital processing channel includes a delay circuit or unit, a resampling circuit or unit and a frequency shifting circuit or unit. Moreover, a method for operating a radar target simulation system is disclosed.

17 Claims, 3 Drawing Sheets

(56) References Cited

U.S. PATENT DOCUMENTS

2018/0203098 A1* 7/2018 Heuel .................. G01S 7/4052

FOREIGN PATENT DOCUMENTS

| DE | 102016121296 A1 | 5/2018 | |
| KR | 2019085774 A * | 7/2019 | ............... G01S 7/40 |

OTHER PUBLICATIONS

CN104515978A_Description_20230623_1659.pdf—translation of CN104515978A (Year: 2015).*
CN109143186A_Description_20230623_1545.pdf—translation of CN109143186A (Year: 2019).*
KR20190085774A_Description_20230623_1853.pdf—translation of KR20190085774A (Year: 2019).*
RadarFundamentals.pdf from https://web.archive.org/web/20181024151319/http://faculty.nps.edu/jenn/seminars/radarFundamentals.pdf (Year: 2018).*
Doppler effect—Wikipedia.pdf from https://web.archive.org/web/20180624084728/http://en.wikipedia.org:80/wiki/Doppler_effect (Year: 2018).*
Fourier transform—Wikipedia.pdf from https://web.archive.org/web/20170727115420/http://en.wikipedia.org/wiki/Fourier_transform (Year: 2017).*
DE102016121296A1_translate_mark.pdf—translation of DE102016121296A1 (Year: 2018).*
Estimation Techniques and Simulation_radars_(EPJ AP).pdf—Bazzi, Ali, et al. "Estimation Techniques and Simulation Platforms for 77 GHz FMCW ACC Radars." from https://web.archive.org/web/20130703075351id_/http://hal-institut-mines-telecom.archives-ouvertes.fr/docs/00/70/41/69/PDF/EPJAP-11-2011.pdf (Year: 2011).*
Plasberg, G., "Simulation von Radarzielen (Simulation of Radar Targets)," Frequenz vol. 45(1991) 5-6, May/Jun. 1991, 16 pages.
"Doppler Shifting A Chirp Signal," Signal Processing, Apr. 1, 2019, 4 pages.

* cited by examiner

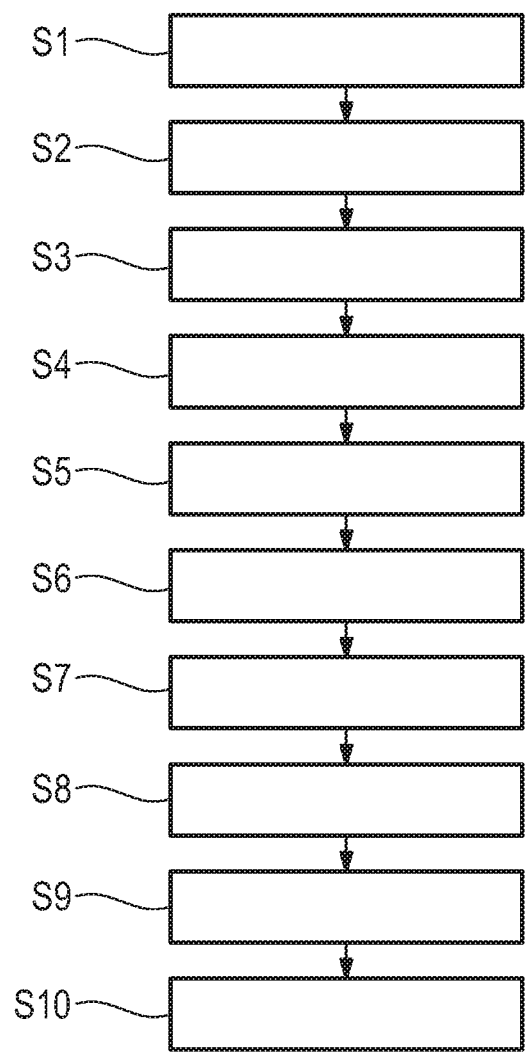

RADAR TARGET SIMULATION SYSTEM, RADAR TEST SYSTEM AND METHOD FOR OPERATING A RADAR TARGET SIMULATION SYSTEM

FIELD OF THE DISCLOSURE

The present disclosure relates to a radar target simulation system for simulating at least one moving radar target. The present disclosure further relates to a radar test system as well as to a method for operating a radar target simulation system.

BACKGROUND

Radar systems become even more common in various use cases for person and cargo transport. While radar systems have been implemented into planes for a long time, the implementation of such radar systems in automotive applications becomes more and more important.

For example, those radar systems are used in driver assistance systems, such as lane change assistants, brake assistants or adaptive cruise controls. The radar systems are also used in automatic driving systems that are configured to control the vehicle at least partially in an automatic manner, in particular autonomously.

In order to test these radar systems, the device under test, e.g. the car comprising the radar system, usually is placed in a test chamber that comprises a radar target simulation system. The radar target simulation system simulates a radar target having a certain velocity and generates a corresponding radar signal that can be used to test characteristics of the radar system.

Typically, the radar system has a certain baseband bandwidth, which causes deviations of the actual radar signal frequency from the carrier frequency of the radar signal. Modern automotive radar systems may have a carrier frequency of about 80 GHz and a bandwidth of about 4 GHz, and the bandwidth may cause sizable errors in the simulation in this case.

SUMMARY

The object of the present disclosure therefore is to provide a radar target simulation system as well as a method for operating a radar target simulation system that provides a precise simulation of radar targets regardless of the carrier frequency and bandwidth.

Accordingly, this object is solved, for example, by one or more examples of the radar target simulation system set forth herein for simulating at least one moving radar target. In an embodiment, the radar target simulation system comprises an analog to digital converter and at least one digital processing channel, wherein the digital processing channel is connected to the analog to digital converter. The digital processing channel comprises a delay circuit or unit, a resampling circuit or unit and a frequency shifting circuit or unit. The delay unit is configured to receive a digitized input signal from the analog to digital converter and to forward the input signal to the resampling unit and/or to the frequency shifting unit with a predetermined time delay. The frequency shifting unit is configured to adapt a frequency of the input signal based on a carrier frequency of the input signal and based on a velocity of the moving radar target that is to be simulated. The resampling unit is configured to rescale the input signal in time domain and/or in frequency domain based on at least one of a momentary frequency of the input signal, a baseband frequency of the input signal, the carrier frequency of the input signal and the velocity of the moving radar target that is to be simulated.

Generally speaking, the radar target simulation systems according to the present disclosure are configured to correctly simulate the effect of the Doppler, which is found to have two conceptionally different contributions. Hence, the radar target simulation systems take both conceptionally different contributions into account in order to correctly simulate the Doppler effect.

The first contribution depends on the carrier frequency of a radar signal, which is constant over time and which causes a Doppler frequency shift that only depends on the velocity of the radar target that is to be simulated. The effect of the first contribution is handled by the frequency shifting unit that appropriately adapts the frequency of the input signal by a frequency shift.

The second contribution depends on the baseband frequency of the radar signal, which varies over time. The idea is that the effect of the second contribution can be described by a rescaling of the input signal in time domain and/or in frequency domain. Therefore, the effect of the second contribution is handled by the resampling unit by a rescaling of the input signal in time domain and/or in frequency domain.

Thus, the examples of the radar target simulation system according to the present disclosure are capable of correctly simulating a moving radar target irrespective of the carrier frequency and the baseband frequency of a radar system of a device under test to be tested. This is due to the fact that both contributions to the Doppler shift are correctly treated by the radar target simulation systems according to the present disclosure.

In some embodiments, the resampling unit is configured to rescale the input signal in time domain and/or in frequency domain based on the momentary frequency of the input signal and/or the baseband frequency of the input signal and/or the carrier frequency of the input signal and/or the velocity of the moving radar target that is to be simulated. This ensures that the different contributions to the baseband frequency of the radar signal varying over time are taken into account.

The simulated radar signal may be continuous and modulated in frequency. Thus, the simulated radar signal may be a FMCW signal."

According to one aspect of the present disclosure, the resampling unit is configured to contract the input signal in time domain and/or to expand the input signal in frequency domain if the radar target that is to be simulated is approaching, and/or characterized in that the resampling unit is configured to expand the input signal in time domain and/or to contract the input signal in frequency domain if the radar target that is to be simulated is departing. Thus, the baseband frequency contribution to the Doppler shift is correctly accounted for in both cases, i.e. in the cases that the radar target to be simulated is approaching or departing from the device under test.

According to another aspect of the present disclosure, the delay unit is configured to delay the input signal via a first-in-first-out technique. The delay unit may therefore also be called "FIFO". The delay unit stores a predetermined number of sample points that are part of the digitized input signal and forward these sample points to the resampling unit in the same order as received, namely in the correct order. Thus, the digitized input signal is forwarded to the resampling unit unaltered with respect to the order, but with the predetermined time delay. The intermediate time interval between the sample points may be maintained. Put differently, all sample points are delayed by the same amount of time.

The delay unit may be configured to store a predetermined number of samples, wherein the predetermined number of samples is adjustable. This accounts for the fact that due to the rescaling of the digitized input signal the time length of the digitized input signal increases or decreases. Accordingly, the number of sample points used to describe a certain portion of the digitized input signal has to be adapted as well.

According to one embodiment of the present disclosure, the delay unit is configured to adjust the number of samples based on the velocity of the moving radar target that is to be simulated. It was found that the time after which the number of samples has to be adjusted only depends on the velocity of the radar target relative to the device on the test and on the speed of light. Thus, the number of samples is correctly adjusted based on the velocity of the radar target.

In a further embodiment of the present disclosure, the resampling unit is configured to continuously rescale the input signal. Thus, the input signal is not rescaled in time domain and/or in frequency domain by a bigger factor at once but rather continuously from a starting scale to a target scale.

A digital to analog converter may be provided, wherein the digital to analog converter is connected to the processing channel downstream of the processing channel. The digital to analog converter may convert at least 3 GS/s ($3 \cdot 10^9$ samples per second), preferably at least 5 GS/s, for example 6.4 GS/s.

Likewise, the analog to digital converter may have a sampling rate of at least 3 GS/s, preferably at least 5 GS/s, for example 6.4 GS/s.

In some embodiments, the analog to digital converter and the digital to analog converter have the same sampling frequency. In other words, the rescaling of the input signal in time domain and/or in frequency domain is completely done by the resampling unit, and not by a differing sampling rate of the analog to digital converter and the digital to analog converter.

According to a further embodiment of the present disclosure, at least a second digital processing channel is provided, wherein the second digital processing channel is connected to the analog to digital converter. The second digital processing channel comprises a second delay circuit or unit, a second resampling circuit or unit and a second frequency shifting circuit or unit. The second delay unit is configured to receive the digitized input signal from the analog to digital converter and to forward the input signal to the second resampling unit and/or to the second frequency shifting unit with a predetermined time delay. The second frequency shifting unit is configured to adapt the frequency of the input signal based on the carrier frequency of the input signal and based on a velocity of a second moving radar target that is to be simulated. The second resampling unit is configured to rescale the input signal in time domain and/or in frequency domain based on at least one of the momentary frequency of the input signal, the baseband frequency of the input signal, the carrier frequency of the input signal and/or the velocity of the second moving radar target that is to be simulated.

Accordingly, a second radar target can be simulated in the second digital processing channel, wherein the first radar target and the second radar target may have velocities that are different from each other. Thus, at least two radar targets having different velocities can be simulated with the radar target simulation system according to the disclosure.

Further digital processing channels may be provided, wherein each of the processing channels may be used to simulate one radar target. Thus, several radar targets having different velocities can be simulated with the radar target simulation system according to the disclosure.

Of course, at least some of the velocities may also be pairwise equal.

A merging circuit or unit may be provided, wherein the merging unit is connected to the processing channels and is configured to superpose output signals of the processing channels. The merging unit combines the individual signals of the digital processing channels that each resemble a specific radar target. Thus, the merged signal contains information on all of the radar targets that are simulated in the individual digital processing channels. Put differently, the merged signal relates to a superposed signal encompassing the individual signals of each processing channel.

According to one aspect of the disclosure, the frequency shifting unit is established as a variable numerically controlled oscillator or as an analog frequency shifter. The output of the numerically controlled oscillator, also called NOC, is a complex valued function of the form $\exp[2\pi i\, f_{NCO} \cdot t]$, wherein $f_{NCO}$ is the frequency of the numerically controlled oscillator. Thus, multiplying the digitized input signal with the output of the numerically controlled oscillator results in frequency shift of the digitized input signal.

In some embodiments, if only one digital processing channel is provided, the frequency shifting unit may also be established as an analog frequency shifter.

According to the disclosure, a radar test system comprising a device under test and the radar target simulation system as described above is provided, wherein the device under test comprises a radar system. Regarding the advantages and properties of the test system, reference is made to the explanations given above with respect to the radar target simulation system, which also hold for the radar test system and vice versa.

The device under test may be established as an automotive radar system. For example, the automotive radar system is part of a driver assistance system such as an adaptive cruise control, an emergency brake system or a lane-keeping assistant. The automotive radar system may also be part of an automatic driving system that is configured to control the vehicle at least partially in an automatic manner, for example autonomously.

Alternatively, the device under test may be any other kind of vehicle having a radar system. For example, the device under test may be a plane, a ship or a utility vehicle such as a truck.

According to the disclosure, a method is provided for operating a radar target simulation system for simulating at least one moving radar target, for example the radar target simulation system described above. In an embodiment, the method comprises the following steps: An input signal is generated that is assigned to a radar signal. The input signal is digitized. The input signal is delayed by a predetermined time delay, for example via a first-in-first-out technique. A frequency of the input signal is adapted based on a carrier frequency of the input signal and based on a velocity of the moving radar target that is to be simulated. The input signal is rescaled in time domain and/or in frequency domain based on a momentary frequency of the input signal, based on a baseband frequency of the input signal, based on the carrier frequency of the input signal and/or based on the velocity of the moving radar target that is to be simulated.

Regarding the advantages and properties of method for operating the radar target simulation system, reference is made to the explanations given above with respect to the radar target simulation system, which also hold for the method and vice versa.

For instance, the input signal is generated based on a radar signal that was received previously.

According to one aspect of the present disclosure, at least two moving radar targets are simulated, wherein the steps of adapting the frequency and rescaling the frequency of the input signal are performed for each of the radar targets that are to be simulated. Therein, each of the digital processing channels of the radar target simulation system may be used to simulate one radar target having a certain velocity, wherein the velocities of the radar targets may be different from each other.

Thus, a method for operating a radar target simulation system is provided that enables a simultaneous simulation of several different radar targets that each may have a different velocity.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 5 schematically shows a flow chart of a method according to an embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
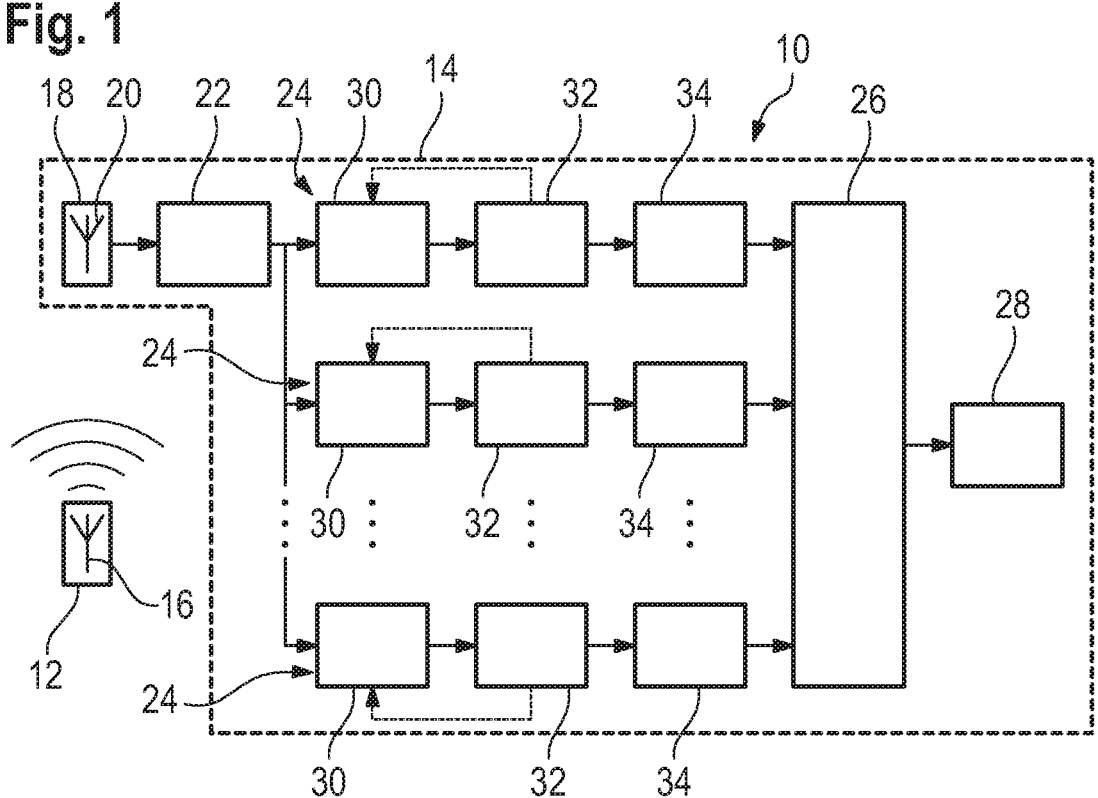
FIG. 1 schematically shows a radar target simulation system according to an embodiment of the present disclosure.

FIG. 1 schematically shows a block diagram of a radar test system 10 comprising a device under test 12 and a radar target simulation system 14. The device under test 12 may be a motor vehicle having an automotive radar system 16.

For example, the automotive radar system 16 is part of a driver assistance system such as an adaptive cruise control, an emergency brake system or a lane-keeping assistant. The automotive radar system 16 may also be part of an automatic driving system that is configured to control the vehicle at least partially automatic, for example autonomous. Alternatively, the device under test 12 may be any other kind of vehicle having a radar system 16. For example, the device under test may be a plane, a ship or a utility vehicle such as a truck.

In the shown embodiment, the radar target simulation system 14 comprises a front end 18 having at least one antenna 20, an analog to digital converter 22, several digital processing channels 24, a merging circuit or unit 26 and a digital to analog converter 28.

In general, the radar target simulation system 14 may comprise only one or two digital processing channels 28. In the following, the general case of m digital processing channels 24 is described, wherein m is a positive natural number.

Each of the digital processing channels 24 is connected to the analog to digital converter 22 downstream of the analog to digital converter 22. Therein and in the following, the terms "downstream" and "upstream" denote the direction of propagation of an electric signal, wherein the electric signal propagates from the upstream component to the downstream component. Thus, in the case above, the electrical signal propagates from the analog to digital converter 22 to the digital processing channels 24.

Moreover, each of the digital processing channels 24 is connected to the merging unit 26 upstream of the merging unit 26.

The digital processing channels 24 each comprise a delay circuit or unit 30, a resampling circuit or unit 32 and a frequency shifting circuit or unit 34. In each digital processing channel 24, the delay unit 30 is connected to the analog to digital converter 22 downstream of the analog to digital converter 22. The resampling unit 32 is connected to the delay unit 30 downstream of the delay unit 30. The frequency shifting unit 34 is connected to the resampling unit 32 downstream of the resampling unit 32 and the frequency shifting unit 34 is connected to the merging unit 26 upstream of the merging unit 26.

Alternatively, the positions of the resampling unit 32 and of the frequency shifting unit may be interchanged such that the frequency shifting unit 34 is interconnected between the delay unit 30 and the resampling unit 32.

The functionality of the individual components will be described in more detail below.

Generally speaking, the radar test system 10 is configured to test the radar system 16 of the device under test 12. For this purpose, the radar target simulation system 14 is configured to receive a radar signal from the radar system 16. The radar target simulator system 14 then simulates at least one, for example several moving targets each having a certain velocity with respect to the device under test 12. Therein, each of the digital processing channels 24 is used to simulate one radar target having a certain velocity, wherein the velocities of the radar targets simulated may be different from each other.

Based on the simulation of the radar targets, the radar target simulation system 14 generates an appropriate simulated radar signal that has properties as if the radar signal generated by the device under test 12 were indeed reflected from the radar targets.

Then, the simulated radar signal may be evaluated on a computer and/or transmitted to the radar system 16 of the device under test 12 and can, e.g., be used to test characteristics of the radar system 16.

Therein, the radar target simulation system 14 needs to correctly take into account the Doppler shift that is caused by the motion of the radar targets to be simulated relative to the device under test 12.

More precisely, the Doppler shift $\Delta f_{Doppler}$ is related to the momentary frequency $f_{CW}$ of the radar signal and to the magnitude of the relative velocity $|v_{rel,i}|$ of the i-th radar target, wherein i=1, 2, . . . , m, by $$\Delta f_{Doppler} = \pm 2 \frac{f_{CW} \cdot |v_{rel,i}|}{c}. \tag{E.1}$$

Therein, c is the speed of light, wherein the "+" sign holds for a target approaching the device under test 12 and the "−" sign holds for a radar target departing from the device under test 12.

In the following, the index "i" will be dropped in order to avoid a clutter of indices and in order to increase legibility. However, it is implicitly assumed that the radar targets to be simulated may have velocities that are different from each other.

Usually, automotive radar systems send out a radar signal having a baseband frequency f that is varying over time and that is modulated on a carrier having a carrier frequency $f_0$ being constant over time. The baseband frequency f typically is much smaller than the carrier frequency $f_0$, i.e. f≪$f_0$. For example, $f_0$≥10 f.

Equation (E.1) can be rewritten to read $$\Delta f_{Doppler} = \pm 2(f_{CW} - f_0) \cdot \frac{|v_{rel}|}{c} \pm 2f_0 \frac{|v_{rel}|}{c} = \pm \frac{2|v_{rel}|}{c} f_0 \pm \frac{2|v_{rel}|}{c} f. \tag{E.2}$$

Accordingly, the Doppler frequency shift has two components. The first component, which will be denoted as the leading order contribution $\Delta f_{Doppler,LO}$ in the following, is due to the first term on the right hand side of equation (E.2), i.e.

$$\Delta f_{Doppler,LO} = \pm 2 \frac{|v_{rel}|}{c} f_0. \tag{E.3}$$

The second component, which will be denoted as the frequency dependent contribution $\Delta f_{Doppler}(f)$ in the following, is due to the second term on the right hand side of equation (E.3), i.e.

$$\Delta f_{Doppler}(f) = \pm 2 \frac{|v_{rel}|}{c} f. \tag{E.4}$$

As already mentioned above, the carrier frequency $f_0$ is usually much bigger than the baseband frequency f. However, neglecting the second term in equation (E.2) can cause non-negligible errors if high precision is aimed for and/or if the radar system 16 has a high bandwidth.

Figure 3:
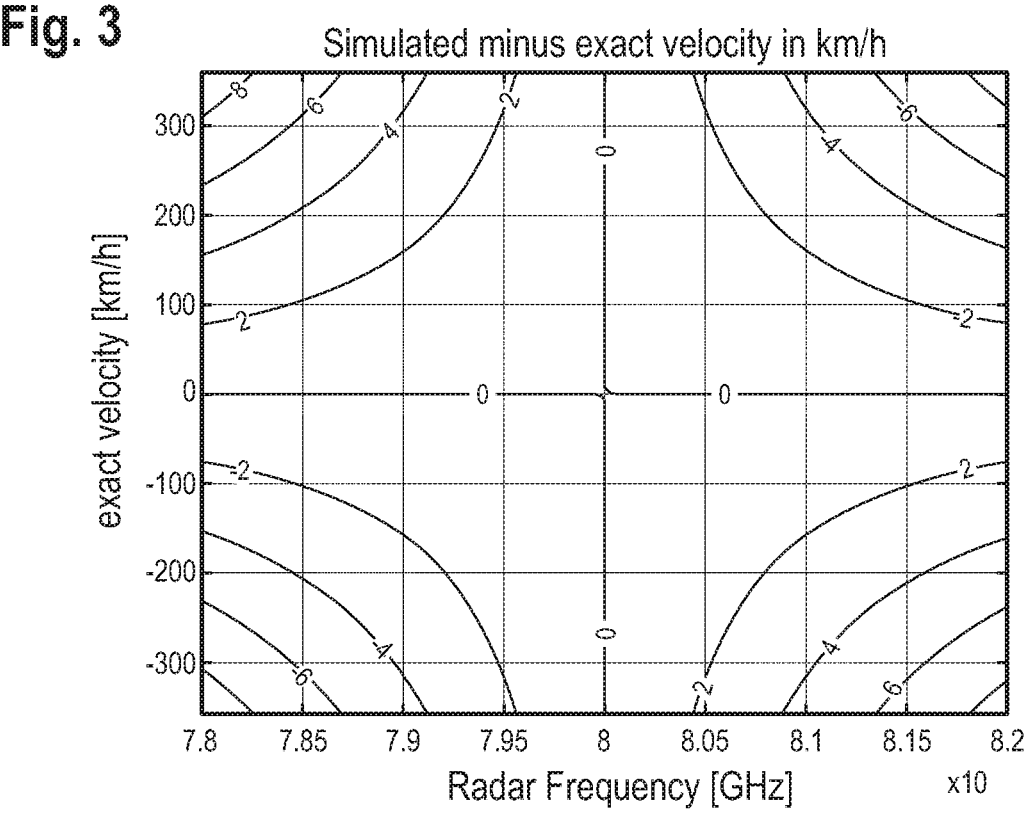
FIG. 3 shows a diagram of a velocity error plotted against exact velocity and radar frequency.
Figure 4:
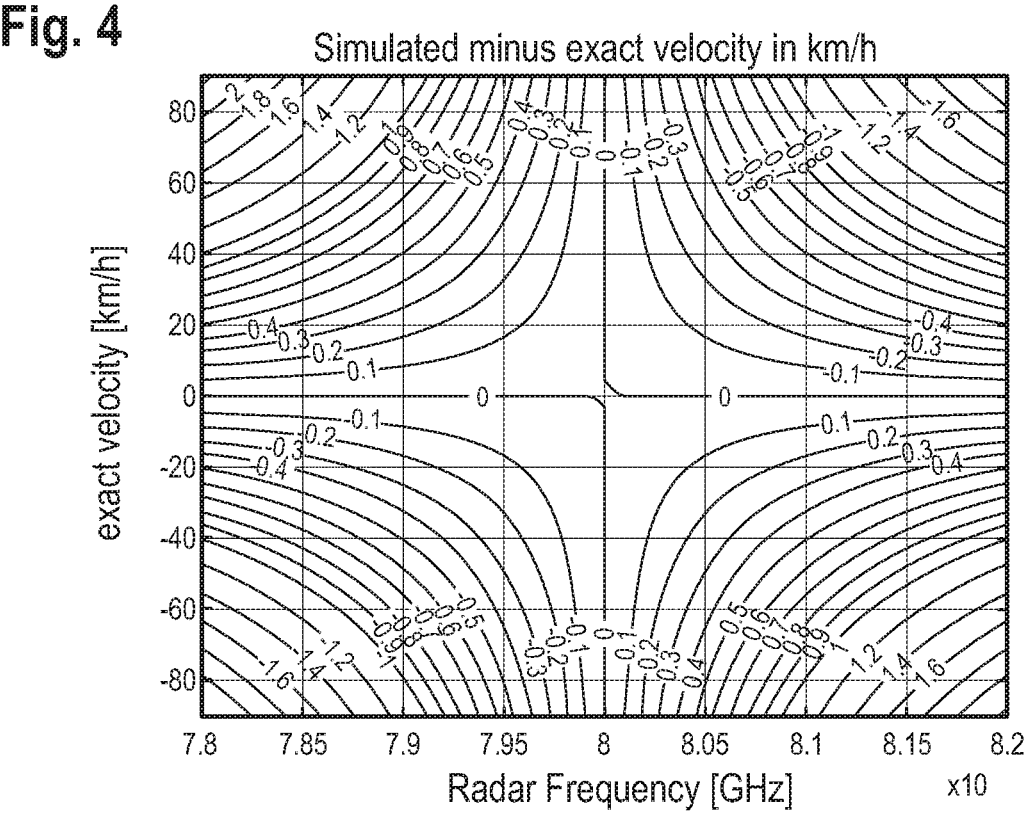
FIG. 4 shows a zoomed-in view of the diagram of FIG. 3.

For example, there are automotive radar systems having a carrier frequency of $f_0$=80 GHz and a bandwidth of about 4 GHz. In this case, the first term in equation (E.2) is not negligible, as is shown in FIGS. 2 to 4.

Figure 2:
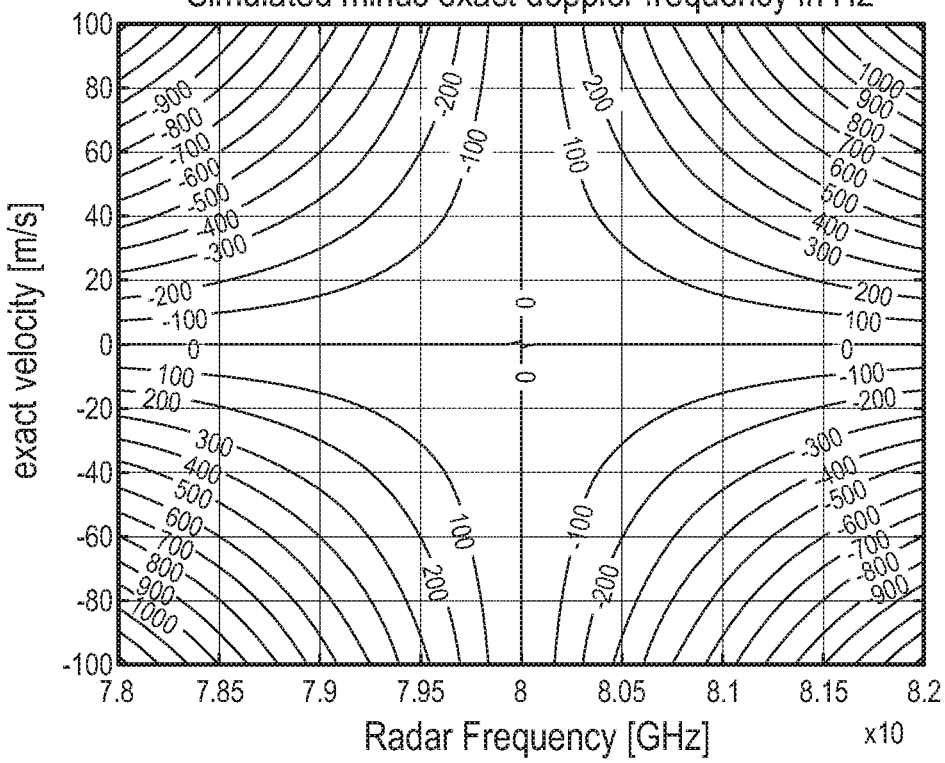
FIG. 2 shows a diagram of a Doppler frequency error plotted against exact velocity and radar frequency.

FIG. 2 shows a plot of Doppler frequency error plotted against exact velocity and carrier frequency, wherein the Doppler frequency error is illustrated by level curves.

As can clearly be seen in FIG. 2, the absolute value of the error rises with rising velocity of the radar target to be simulated. Moreover, the absolute error rises with rising deviation of the momentary radar frequency from the carrier frequency $f_0$=80 GHz.

Accordingly, in the excerpt of the radar frequency-velocity plane shown in FIG. 2, the error is maximal for f=±2 GHz and $v_{rel}$=±100 m/s. In this case, the error is bigger than 1 kHz.

Analogously, FIGS. 3 and 4 each show a diagram of a velocity error plotted against the exact velocity of the radar target to be simulated and the radar frequency. From FIGS. 3 and 4 it is apparent that the absolute value of the velocity error rises with both rising absolute value of exact velocity and with rising absolute value of the deviation of the radar frequency from the carrier frequency $f_0$=80 GHz.

As can further be seen from FIGS. 3 and 4, the relative error increases with increasing deviation of the radar frequency from the carrier frequency $f_0$=80 GHz. For example, for f=±2 GHz, the relative error is about 2.5%.

Thus, in order to correctly simulate a moving radar target with high precision, the second term on the right-hand side of equation (E.2) needs to be taken into account.

For this purpose, the radar test system 10, more specifically the radar target simulation system 14 is configured to perform the method described in the following with reference to FIG. 5.

First, a radar signal is generated by the device under test 12 or rather by the radar system 16 of the device under test 12 (step S1).

The radar signal is received by the front end 18 via the antenna 20, wherein an input signal is generated by the front end 18 based on the received radar signal, which input signal is forwarded to the analog to digital converter 22 (step S2).

The input signal is then digitized by the analog to digital converter 22 (step S3). The input signal may be digitized with a sampling rate of at least 3 GS/s (3·$10^9$ samples per second), preferably with a sampling rate of at least 5 GS/s, for example with a sampling rate of 6.4 GS/s. In some embodiments, the sampling rate of the analog to digital converter 22 is constant over time.

The digitized input signal is then forwarded to each of the digital processing channels 24, more precisely to each of the delay units 30 (step S4).

The delay units 30 receive the digitized input signal and forward the unaltered digitized input signal to the respective resampling unit 32 with a predetermined time delay (step S5).

The delay units 30 may each use a first-in-first-out technique (FIFO technique) to delay the digitized input signal. The delay units 30 may therefore also be called "FIFOs".

The delay units 30 store a predetermined number of sample points that are part of the digitized input signal and forward these sample points to the resampling units 32 in the same order as received. Thus, the digitized input signal is forwarded unaltered to the respective resampling unit 32.

The digitized input signal is then rescaled in time domain and/or in frequency domain by the resampling unit 32 in order to account for the deviation of the radar signal frequency from the carrier frequency $f_0$, i.e. to account for the baseband frequency f (step S6).

Therein, the resampling unit 32 may be established as a linear interpolator or as a polyphase finite impulse response filter.

Generally speaking, the frequency dependent Doppler shift of equation (E.4) is tantamount to a rescaling of the frequency axis by a factor of $$1 \pm \frac{2v_{rel}}{c},$$

as can be seen from $$X\left(f \pm 2\frac{|v_{rel}|}{c}f\right) = X\left(\left(1 \pm \frac{2|v_{rel}|}{c}\right)f\right), \quad (E.5)$$

wherein $X(f)$ is a function describing the digitized input signal in frequency domain.

For the time domain function $x(t)$ corresponding to the frequency domain function $X(f)$, it is well-known that scaling the time axis with a factor $\alpha$ corresponds to a scaling of the frequency axis with a factor $1/\alpha$. More precisely, it holds $$FT[x(\alpha \cdot t)] = \frac{1}{|\alpha|} X\left(\frac{f}{\alpha}\right). \quad (E.6)$$

Using the fact that due to the sampling of the digitized input signal the time $t$ only takes discrete values $t=n \cdot T$, wherein $T=1/f_S$ is the inverse of the sampling frequency $f_S$, and further using the geometric series for small values of $x$, i.e. $1/(1 \pm x) \approx 1 \mp x$, one obtains the following equation:

$$FT\left[\left(1 \pm \frac{2|v_{rel}|}{c}\right)x\left(\frac{t}{1 \pm \frac{2|v_{rel}|}{c}}\right)\right] = X\left(\left(1 \pm \frac{2|v_{rel}|}{c}\right)f\right), \quad (E.7)$$

and $$x\left(\frac{t}{1 \pm \frac{2|v_{rel}|}{c}}\right) = x\left(\frac{n \cdot T}{1 \pm \frac{2|v_{rel}|}{c}}\right) \approx x\left(\left(1 \mp \frac{2|v_{rel}|}{c}\right) \cdot n \cdot T\right). \quad (E.8)$$

In other words, scaling the frequency axis with a factor $$R_{\pm} = 1 \pm \frac{2|v_{rel}|}{c}$$

corresponds to scaling the time axis with a factor $$R_{\mp} = 1 \mp \frac{2|v_{rel}|}{c},$$

as long as $|v_{rel}| \ll c$, which is always the case in the use cases discussed above.

Accordingly, the resampling unit 32 rescales the frequency axis by a factor $R_{\pm}$ and/or the time axis by a factor $R_{\mp}$.

More precisely, each of the resampling units 32 is associated with one particular radar target that is to be simulated. Accordingly, each resampling unit 32 rescales the digitized input signal in time domain and/or in frequency domain with an appropriate scaling factor based on the velocity of the associated radar target.

Due to the rescaling of the time axis and/or of the frequency axis, the number of samples stored in the delay unit 30 needs to be adjusted (step S7), as is indicated by the dotted arrows in FIG. 1.

In other words, the depth of the FIFO, i.e. the delay unit 30 is adjusted based on the respective velocity of the radar target that is to be simulated.

More precisely, the number of stored samples is increased if the respective radar target that is to be simulated departs from the device under test 12. Analogously, the number of stored samples is reduced if the respective radar target approaches the device under test 12.

Therein, the number of samples stored in the delay unit 30 is adjusted after $\Delta n = c/(2|v_{rel}|)$ samples. Thus, the number of samples after which the stores number of samples is adjusted is independent of the sampling frequency, but only depends on the velocity of the respective radar target that is to be simulated.

The combined effect of step S6 and step S7, i.e. the combined effect of continuously rescaling the digitized input signal in time domain and/or in frequency domain and adjusting the number of stores samples of $\Delta n$ samples can be seen from the following equation:

$$x\left(\frac{n \cdot T}{1 \pm \frac{2|v_{rel}|}{c}}\right) \approx x\left(\left(1 \mp \frac{2|v_{rel}|}{c}\right) \cdot n \cdot T\right) \quad (E.9)$$

$$= x((1 \mp \Delta n^{-1}) \cdot n \cdot T)$$

$$= x\left(n \cdot T \mp \frac{n}{\Delta n} \cdot T\right)$$

As is apparent from the right hand side of equation (E.9), the input signal is contracted ("−" sign) or expanded ("+" sign) by one sample period time T after $n = \Delta n = c/(2|v_{rel}|)$ sample points.

As $c/(2|v_{rel}|)$ usually is a non-integer number, $\Delta n$ may be rounded in order to determine the number of samples after which the number of samples stores in the delay unit 30 is increased or decreased.

In other words, one sample point is respectively removed from or added to the storage of the delay unit 30 in the appropriate moment when the input signal is contracted or expanded by one sample period time T.

The rescaled input signal is then forwarded to the frequency shifting unit 34. Generally speaking, the frequency shifting unit 34 shifts the frequency of the rescaled input signal by a fixed amount, namely by $\Delta f_{Doppler,LO}$ (step S8).

In principal, this can be achieved by any suitable method known from the state of the art.

In some embodiments, the frequency shifting unit 34 is established as a numerically controlled local oscillator having a frequency that is equal to the carrier frequency $f_0$ multiplied by $$\pm \frac{2|v_{rel}|}{c}.$$

The output of the numerically controlled oscillator is a complex-valued signal $$x_{NCO}(t) = e^{\pm 2\pi i \frac{2|v_{rel}|}{c} f_0 \cdot t}. \quad (E.10)$$

Multiplying the rescaled input signal with output $x_{NCO}(t)$ of the numerically controlled oscillator results in a frequency shift of the rescaled input signal by $$\Delta f_{Doppler,LO} = \pm \frac{2|v_{rel}|}{c} f_0.$$

Thus, in steps S6 to S8, both contributions to the Doppler shift in equation (E.2) are correctly incorporated into the simulation of the radar targets.

It is emphasized that in each of the digital processing channels 24, the appropriate velocity $v_{rel,i}$ for the i-th radar target is used.

The individual rescaled and frequency shifted input signals propagating in the digital processing channels are combined into a single signal by the merging unit 26, thereby generating a merged input signal (step S9).

Accordingly, the merged input signal contains information on all m radar targets that are to be simulated, for example information on the velocities and on the position of the radar targets relative to the device under test.

The merged input signal is converted into an analog radar transmission signal by the digital to analog converter 28 (step S10). Therein, the digital to analog converter 28 converts at least 3 GS/s ($3 \cdot 10^9$ samples per second), preferably at least 5 GS/s, for example 6.4 GS/s. In some embodiments, the sampling rate of the analog to digital converter 22 and the conversion rate of the digital to analog converter 28 are equal to each other.

The radar transmission signal may then be forwarded to a radar antenna, for example to the antenna 20, via which the radar transmission signal is transmitted to the device under test 12.

Summarizing, the radar test system 10 according to the disclosure provides an exact simulation of the Doppler frequency shift of one or several moving radar targets, wherein the individual radar targets may have different velocities.

Accordingly, the device under test 12, or rather the radar system 16 can be tested with high precision via the radar transmission signal generated by the radar target simulation system 14.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A radar target simulation system for simulating a moving radar target, comprising:
   an analog to digital converter; and
   at least one digital processing channel connected to the analog to digital converter, wherein the digital processing channel comprises a delay unit, a resampling unit and a frequency shifting unit,
   wherein the delay unit is configured to receive a digitized input signal from the analog to digital converter and to forward the input signal to at least one of the resampling unit and the frequency shifting unit with a predetermined time delay,
   wherein the input signal has a carrier frequency $f_0$ and a baseband frequency f, wherein the carrier frequency $f_0$ is constant over time, wherein the baseband frequency f is varying over time,
   wherein the frequency shifting unit is configured to adapt a frequency of the input signal based on the carrier frequency $f_0$ of the input signal and based on a velocity of the moving radar target that is to be simulated, wherein the frequency shifting unit is configured to shift the frequency of the input signal by $$\Delta f_{Doppler,LO} = \frac{2|v_{rel}|}{c} f_0$$

or by $$\Delta f_{Doppler,LO} = -\frac{2|v_{rel}|}{c} f_0,$$

and wherein the resampling unit is configured to one of contract the input signal in time domain by rescaling a time variable t with a factor $R_- = 1 - 2|v_{rel}|/c$, expand the input signal in time domain by rescaling the time variable t with a factor $R_+ = 1 + 2|v_{rel}|/c$, contract the input signal in frequency domain by rescaling the baseband frequency f with the factor $R_- = 1 - 2|v_{rel}|/c$, or expand the input signal in frequency domain by rescaling the baseband frequency f with the factor $R_+ = 1 + 2|v_{rel}|/c$ in order to rescale the input signal, wherein the time variable t is linked to the baseband frequency f, wherein c is the speed of light, and wherein $|v_{rel}|$ is the magnitude of the velocity of the moving radar target.

2. The radar target simulation system of claim 1, wherein the resampling unit is configured to at least one of contract the input signal in time domain and expand the input signal in frequency domain if the radar target that is to be simulated is approaching.

3. The radar target simulation system of claim 1, wherein the resampling unit is configured to at least one of expand the input signal in time domain and contract the input signal in frequency domain if the radar target that is to be simulated is departing.

4. The radar target simulation system according to claim 1, wherein the delay unit is configured to delay the input signal via a first-in-first-out technique.

5. The radar target simulation system according to claim 1, wherein the delay unit is configured to store a predetermined number of samples, wherein the predetermined number of samples is adjustable.

6. The radar target simulation system according to claim 5, wherein the delay unit is configured to adjust the number of samples based on the velocity of the moving radar target that is to be simulated.

7. The radar target simulation system according to claim 1, wherein the resampling unit is configured to continuously rescale the input signal.

8. The radar target simulation system according to claim 1, wherein a digital to analog converter is provided, wherein the digital to analog converter is connected to the processing channel downstream of the processing channel.

9. The radar target simulation system according to claim 8, wherein the analog to digital converter and the digital to analog converter have the same sampling frequency.

10. The radar target simulation system according to claim 1, wherein at least a second digital processing channel is provided, wherein the second digital processing channel is connected to the analog to digital converter, wherein the second digital processing channel comprises a second delay unit, a second resampling unit and a second frequency shifting unit, wherein the second delay unit is configured to receive the digitized input signal from the analog to digital converter and to forward the input signal to at least one of the second resampling unit and the second frequency shifting unit with a predetermined time delay, wherein the second frequency shifting unit is configured to adapt the frequency of the input signal based on the carrier frequency of the input signal and based on a velocity of a second moving radar target that is to be simulated, and wherein the second resampling unit is configured to rescale the input signal in at least one of time domain and frequency domain based on at least one of the momentary frequency of the input signal, the baseband frequency of the input signal, the carrier frequency of the input signal and the velocity of the second moving radar target that is to be simulated.

11. The radar target simulation system according to claim 10, wherein a merging unit is provided, wherein the merging unit is connected to the processing channels and is configured to superpose output signals of the processing channels.

12. The radar target simulation system according to claim 1, wherein the frequency shifting unit is established as a variable numerically controlled oscillator or as an analog frequency shifter.

13. A radar test system comprising:
the radar target simulation system according to claim 1; and
a device under test,
wherein the device under test comprises a radar system.

14. The radar test system of claim 13, wherein the device under test is established as an automotive radar system.

15. A method for operating a radar target simulation system for simulating a moving radar target, comprising:
generating an input signal assigned to a radar signal, wherein the input signal has a carrier frequency f0 and a baseband frequency f, wherein the carrier frequency $f_0$ is constant over time, and wherein the baseband frequency f is varying over time;
digitizing the input signal;
delaying the input signal by a predetermined time delay;
adapting a frequency of the input signal based on the carrier frequency fo of the input signal and based on a velocity of the moving radar target that is to be simulated, wherein the frequency of the input signal is shifted by $$\Delta f_{Doppler,LO} = \frac{2|v_{rel}|}{c} f_0$$

or by $$\Delta f_{Doppler,LO} = -\frac{2|v_{rel}|}{c} f_0;$$

and rescaling the input signal in at least one of time domain and frequency domain based on the velocity of the moving radar target that is to be simulated, wherein the input signal is one of contracted in time domain by rescaling a time variable t with a factor $R_- = 1 - 2|v_{rel}|/c$, expanded in time domain by rescaling the time variable t with a factor $R_+ = 1 + 2|v_{rel}|/c$, contracted in frequency domain by rescaling the baseband frequency f with the factor $R_- = 1 - 2|v_{rel}|/c$, or expanded in frequency domain by rescaling the baseband frequency f with the factor $R_+ = 1 + 2|v_{rel}|/c$ in order to rescale the input signal, wherein the time variable t is linked to the baseband frequency f, wherein c is the speed of light, and wherein $|v_{rel}|$ is the magnitude of the velocity of the moving radar target.

16. The method of claim 15, wherein the input signal is delayed via a first-in-first-out technique.

17. The method of claim 15, wherein at least two moving radar targets are simulated, wherein the steps of adapting the frequency and rescaling the frequency of the input signal are performed for each of the radar targets that are to be simulated.

* * * * *